(12) United States Patent
Baumgart

(10) Patent No.: US 8,943,549 B2
(45) Date of Patent: Jan. 27, 2015

(54) METHODS AND SYSTEMS FOR ONLINE FRAUD PROTECTION

(75) Inventor: Mark D. Baumgart, Larkspur, CO (US)

(73) Assignee: First Data Corporation, Greenwood Village, CO (US)

( * ) Notice: Subject to any disclaimer, the term of this patent is extended or adjusted under 35 U.S.C. 154(b) by 877 days.

(21) Appl. No.: 12/190,392

(22) Filed: Aug. 12, 2008

(65) Prior Publication Data

US 2010/0043055 A1    Feb. 18, 2010

(51) Int. Cl.
   *G06F 21/00*   (2013.01)
   *G06Q 20/12*   (2012.01)
   *G06Q 20/40*   (2012.01)
   *G06Q 30/06*   (2012.01)

(52) U.S. Cl.
   CPC ............ *G06Q 20/12* (2013.01); *G06Q 20/4014* (2013.01); *G06Q 30/06* (2013.01)
   USPC ................. 726/2; 726/10; 713/156; 713/175; 705/39; 705/40

(58) Field of Classification Search
   CPC ..... H04L 63/08; G06F 21/31; G06Q 20/4014
   USPC .............. 726/2, 10; 713/156, 175; 705/39, 40
   See application file for complete search history.

(56) References Cited

U.S. PATENT DOCUMENTS

| | | | |
|---|---|---|---|
| 7,356,505 B2 * | 4/2008 | March | 705/39 |
| 7,685,067 B1 * | 3/2010 | Britto et al. | 705/40 |
| 2003/0154406 A1 | 8/2003 | Honarvar et al. | |
| 2004/0199462 A1 * | 10/2004 | Starrs | 705/39 |
| 2004/0230527 A1 * | 11/2004 | Hansen et al. | 705/40 |
| 2005/0116025 A1 | 6/2005 | Davis | |
| 2006/0202012 A1 | 9/2006 | Grano et al. | |
| 2006/0212930 A1 * | 9/2006 | Shull et al. | 726/10 |
| 2006/0287902 A1 * | 12/2006 | Helsper et al. | 705/7 |
| 2007/0177768 A1 | 8/2007 | Tsantes et al. | |
| 2008/0010678 A1 * | 1/2008 | Burdette et al. | 726/15 |
| 2008/0140441 A1 * | 6/2008 | Warner | 705/1 |
| 2009/0089869 A1 * | 4/2009 | Varghese | 726/7 |

OTHER PUBLICATIONS

PCT International Seach Report and Written Opinion mailed Mar. 29, 2010; International Application No. PCT/US2009/053605; 11 pages.
Supplementary European Search Report mailed Sep. 6, 2013 for European Application No. EP 09807252.3 filed on Aug. 12, 2009, 2 pages.

* cited by examiner

*Primary Examiner* — Saleh Najjar
*Assistant Examiner* — Peiliang Pan
(74) *Attorney, Agent, or Firm* — Kilpatrick Townsend & Stockton LLP

(57) ABSTRACT

This disclosure describes, generally, methods and systems for certifying user identities (IDs). The method includes receiving, from a customer, a certification request for a user ID. The method then identifies the user ID's owner and collects information about the owner. The information may include financial information, personal information, biographical information, etc. The method then analyzes the collected information to generate a risk score associated with the user ID, and based on the risk score exceeding a threshold, the method certifies the user ID.

22 Claims, 6 Drawing Sheets

METHODS AND SYSTEMS FOR ONLINE FRAUD PROTECTION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to ecommerce and, more particularly, to certifying user identities (IDs) associated with ecommerce websites.

BACKGROUND

Currently, users of ecommerce websites (e.g., online auctions, online classified sites, etc.) have little or no way of determining the reliability of buyers or sellers associated with the ecommerce site. Typically, a user only has the ability to view past transaction and customer feedback. Unfortunately, this information can often be inadequate as well as inaccurate.

Often this information is purely user generated, which can lend itself to misleading information, or fraudulent information. In some situations, transactions with positive feedback can be fabricated or fraudulent transactions between friends or associates of the user. Accordingly, without third-party assurances about a buyer or seller, users of ecommerce sites are left guessing as to the reliability of a transaction. Hence, there is a need for improved methods and systems in the art.

BRIEF SUMMARY

Embodiments of the present invention are directed to a computer implemented method of certifying user identities (IDs). The method includes receiving, from a customer, a certification request for a user ID. The method then identifies the user ID's owner and collects information about the owner. The information may include financial information, personal information, biographical information, etc. The method then analyzes the collected information to generate a risk score associated with the user ID, and based on the risk score exceeding a threshold, the method certifies the user ID.

In an alternative embodiment, a machine-readable medium is described. The machine-readable medium may include instructions for certifying user identities (IDs). The machine-readable medium includes instructions for receiving, from a customer, a certification request for a user ID. The machine-readable medium then includes instructions for identifying the user ID's owner and collects information about the owner. The information may include financial information, personal information, biographical information, etc. The machine-readable medium then includes instructions for analyzing the collected information to generate a risk score associated with the user ID, and based on the risk score exceeding a threshold, the machine-readable medium includes instructions for certifying the user ID.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to certifying user identity (ID) accounts associated with ecommerce websites. In one embodiment, either an online buyer or seller would subscribe to a certification service directed at providing the buyer and/or seller with assurances that their transactions will be successful. For example, a seller may receive a winning bid from a potential buyer, but before sending the item the seller would like to be sure that the buyer is going to pay. Accordingly, the potential buyer's financial and personal information can be analyzed to determine the buyer's likelihood of paying.

Based on the analysis a risk score may be assigned to the buyer. If the risk score meets or exceeds a given threshold, then the buyer can be certified. Otherwise, if the risk score does not exceed the threshold, no certification is given. Hence, if the buyer is certified the seller can feel confident in shipping the item to the buyer. Accordingly, if the buyer does not pay for the item or defrauds the seller in some way, the service provider would cover the loss to the seller. Additional details are realized in the description of the figures below.

Figure 1:
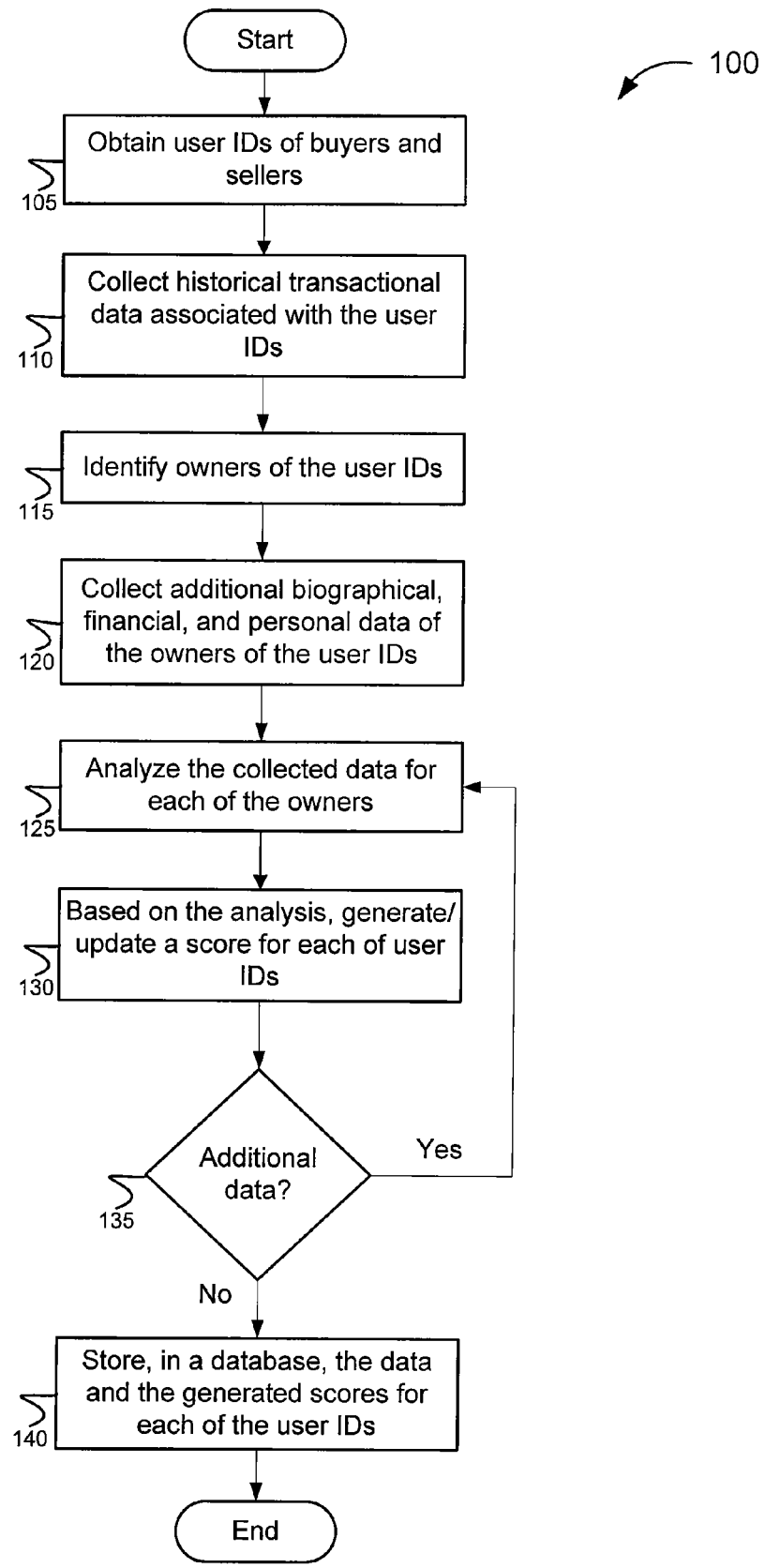
FIG. 1 is a flow diagram illustrating one embodiment of a method for certifying user identity (ID) accounts.

FIG. 1 which illustrates a method 100 for certifying user ID accounts according to aspects of the present invention. At process block 105, a user ID certification service provider may obtain a number of user IDs associated with buyer and seller accounts for various ecommerce sites. In one embodiment, ecommerce sites may include online auction sites (e.g., eBay.com™, uBid.com™, etc.) classified sites (e.g., carfinder.com™, autotrader.com™, individual newspaper classifieds online, etc.), brick and mortar company's' online sites, etc. In a further embodiment, customers of the service may signup with the service provider. Thus, in signing up for the service, the customer's user ID, personal information, financial information, transaction history, etc. may be provided to the service provider (process block 110). In addition, information about the user IDs of each of the accounts in which the customer has previously completed transactions may also be gathered.

In one embodiment, in order to gather personal and financial information about the user IDs, the owners of the user IDs may need to be identified (process block 115). In some situations the ecommerce site may provide access to information about owners of user IDs to the service provider. Typically, if the ecommerce site believes that the service provider is going to enhance the service of the ecommerce site (e.g., provide certification of buyers and/or sellers) then the ecommerce site is willing to provide such information. The ecommerce site may provide the user ID owners' names, addresses, phone numbers, transaction history, payment history, financial information, social security company (SSN), etc.

At process block 120, additional biographical, financial, and personal information for the owners of the user IDs may be collected. For example, from an owner's SSN, the owner's credit report, credit history, and credit score may be obtained. The owner's financial records may be analyzed to determine how many chargebacks, bad checks, insufficient funds, denial of payment, etc. have occurred. Furthermore, it may be determined how many times the owner has used a credit card online, how many chargbacks per online transaction, etc. In addition, buyer or seller generated feedback may also be collected.

Additionally, demographic and/or biographical information about the owners may be collected. For example, owners that reside in certain geographical areas or have certain zip codes may be more likely to default on a payment or attempt to perpetrate fraud. Additionally, owners with certain socio-economic backgrounds may be more of a risk to a buyer and/or a seller.

As the service provider signs up additional customers and the customers complete more transactions with buyers and sellers, the service provider's historical data for the user IDs increases. This process will continue and information about each user ID may be stored until nearly all the user IDs associated with an ecommerce site have information collected about them. Accordingly, based on the collected data about each of the user IDs, an analysis of each of the user IDs may be performed in order to determine each of their risk levels (process block 125).

At process block 130, based on the analysis of the of the information collected about each of the user IDs, a risk score may be generated for each user ID. Such a risk score may be generated by initially assigning each user ID with a "base score" and then adding to or subtracting from that base score based on the collected information. For example, if the owner of the user ID has completed 100 online purchases using their credit card without any chargebacks, then 20 points may be added to the base score. However, if the owner has had 10 "negative feedbacks" in the last 3 months, then 15 points would be deducted from the base score.

Alternatively, in order to determine whether owner of the user ID will complete a successful transaction a number of data points may be analyzed. For example, such data points may include information from the auction site (e.g., feedback, feedback commenter's ID, feedback score of commenter, comment time, comment type (i.e., positive, negative, neutral, withdrawn), feedback history (i.e., count of feedback types), feedback history period of days, item ID, item price, the product code, positive feedback periods, unique positive feedback, feedback score of owner of the user ID, user status (i.e., restricted, probation, new user, etc.), user's auction site store name, store type, user ID owner's first and last name and address, new user flag, date and/or time of transaction request, user's email address).

Furthermore, the data points may include seller or buyer personal information (i.e., information that may be gathered during an enrollment process). Such personal information may include internal merchant ID, name, address, tax ID/SSN, eCommerce site ID(s), etc. In addition, the data points may be based on information gathered by a processing center. For example, the processing center may gather information such as first time user status, an amount to store average, an amount to buyer average, a transaction history, etc. Accordingly, after gathering data similar to that described above, the data can be analyzed (possibly using regression analysis), in order to calculate the probability whether the owner of the user ID would complete a successful transaction of not. Then, based on the calculated probability, a decision may be made whether to certify the user ID, allow the transaction, decline the transaction, etc.

Furthermore, each category of information may be assigned a weighting. For example, an owner's credit score may be weighted higher (i.e., of more importance to determining risk), than the owner's zip code. Alternatively, each of the categories of information may be scored and a total risk score may be assigned based on an average of summing of the aggregation of the categorical scores. Nonetheless, other methods and/or algorithms may be employed to determine the risk score for each of the user IDs.

In an alternative embodiment, after each piece of information gathered about each of the user IDs has been analyzed and points added or subtracted from the based score, each user ID would be assigned a risk score. The risk score would then be used by the service provider to determine the risk level associated with each of the user IDs. This risk score would be used to direct the service provider whether or not to certify the user ID, place the user ID in a negative database, etc. In one embodiment, a negative database may be used to compile and store negative history and other information about a user ID.

In one embodiment, the list of user IDs may be posted with their associated risk scores. Hence, customers that have signed up for the service may be able to browse and/or search the list to determine the risk level of each of the buyers and/or sellers with whom they may be doing business. In addition, the "certified buyers or sellers" may be given an associated logo or other identifier which indicates they have been certified by the service provider. Accordingly, when, for example, buyers are browsing through items to purchase, they can be assured of the success of any transactions with a "certified seller." Alternatively, user IDs with poor risk scores may be placed in the negative database and posted on, for example, a website which would inform customers not to enter into any transactions with these user IDs.

At decision block 135, a determination may be made whether additional information regarding a user ID owner has been subsequently collected. Accordingly, if additional information has been collected, the information would be analyzed (process block 125) and factored into the risk score associated with the user ID (process block 130). Hence, the risk scores associated with each of the user IDs are continuously updated and modified to reflect the most recent information about each of the user ID owners. For example, a user ID may have initially been assigned a high rating, but has recently not paid for 3 items in a row. Therefore, this user ID's associated score may be drastically reduced, or the user ID may even placed in the negative database. Thus, customers of the service provided are afforded the most accurate and up-to-date information about each user ID.

At process block 140, the information collected about each user ID owner, and the risk scores associated with the user IDs, may be stored in a data store. In one embodiment, the information may be stored in a database which may be searched and/or accessed to readily retrieve the risk scores in order to present them to customers when needed.

Figure 2:
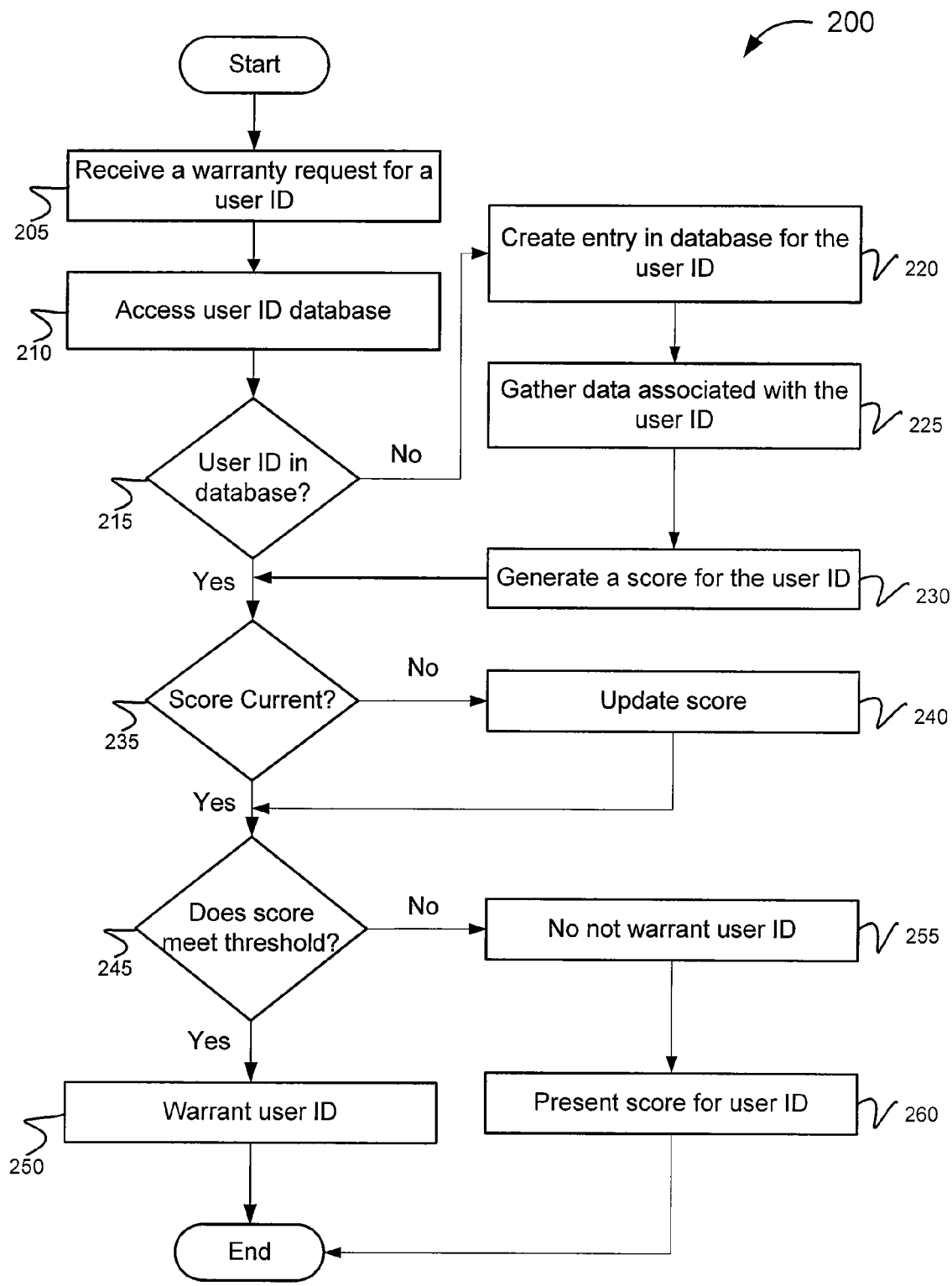
FIG. 2 is a flow diagram illustrating one embodiment of scoring transactions in order to built a database and analyze a user ID history to generate a score (or probability).

Once a customer has signed up for the certification (or warranty) service, the customers may generate "warranty requests." FIG. 2 illustrates a method 200 for scoring transactions in order to built a database and analyze a user ID history to generate a score (or probability) according to aspects of the present invention. At process block 205, the service provider may receive a warranty (or certification) request for a particular user ID. In one embodiment, the request may be associated with an attempt to bid on an item by the customer as a buyer or an attempted bid for on item by a potential buyer of the customer's item in which the customer is the seller. Alternatively, the request may be from a customer that simply desires to know the risk level associated with a user ID (i.e., because the customer may want to do business with the user in the future).

Often with online auction sites, placing a bid which wins and then not purchasing the item can result in negative feedback. Similarly, refusing to sell an item to the highest bidder can also result in negative feedback. As a result, the request may be initiated prior to allowing the customer to place their bid to purchase an item, or allowing a potential buyer to place their bid to purchase a customer's item. Hence, if the user ID cannot be certified, then a bid may not even be allowed to take place, thus avoiding potential negative feedback.

At process block 210, a user ID database may be accessed to search the user ID for which the warranty request is associated. Based on the search it is determined whether the user ID is included within the database (decision block 215). If the user ID is not included in the database, then a new entry may be created for the user ID (process block 220). Information about the owner of the user ID may be collected (see FIG. 1 above) and a risk score for that user ID may be generated (process blocks 225 and 230).

Subsequently, a determination may be made on whether the risk score associated with the user ID is current (decision block 235). If the risk score is not current, then, based on the additional information received regarding the user ID, it may be analyzed and the score may then be updated (process block 240). Otherwise, based on the update/current score associated with the user ID, a determination may be made whether the score meets a threshold value (decision block 245).

For example, risk scores may be between 0 and 100, where 100 is a perfect score. Depending on the level of certainty desired by the customer and/or service provider, the threshold may be set at various values. In one embodiment, the threshold may be set to 80, whereas in an alternative embodiment the threshold may be set to 70. Nonetheless, the threshold may be set and/or altered based on the preferences of the customer and/or the service provider.

If the risk score associated with the user ID meets or exceeds the threshold value, then the service provider would warrant the transaction with the user ID (process block 250). However, if the risk score associated with the user ID does not meet the threshold value, then the service provider would not warrant (or certify) any transactions with the owner of the user ID (process block 255). However, the service provider may still present the score associated with the user ID to the customer (process block 260). In this situation, the customer may be presented with the option of deciding whether or not to proceed with a non-certified transaction with the owner of the user ID. For example, if the threshold was 70 points and the user ID had 68 points associated with it, the service provider would not certify the user ID and associated transactions, but the customer may be confident enough (or the item may be important enough to the customer) to proceed with the transaction. In such a situation, the service provider may require the customer to agree that any transactions with this user ID would not be certified (e.g., using a click button agreement, a checkbox agreement, etc.).

Figure 3:
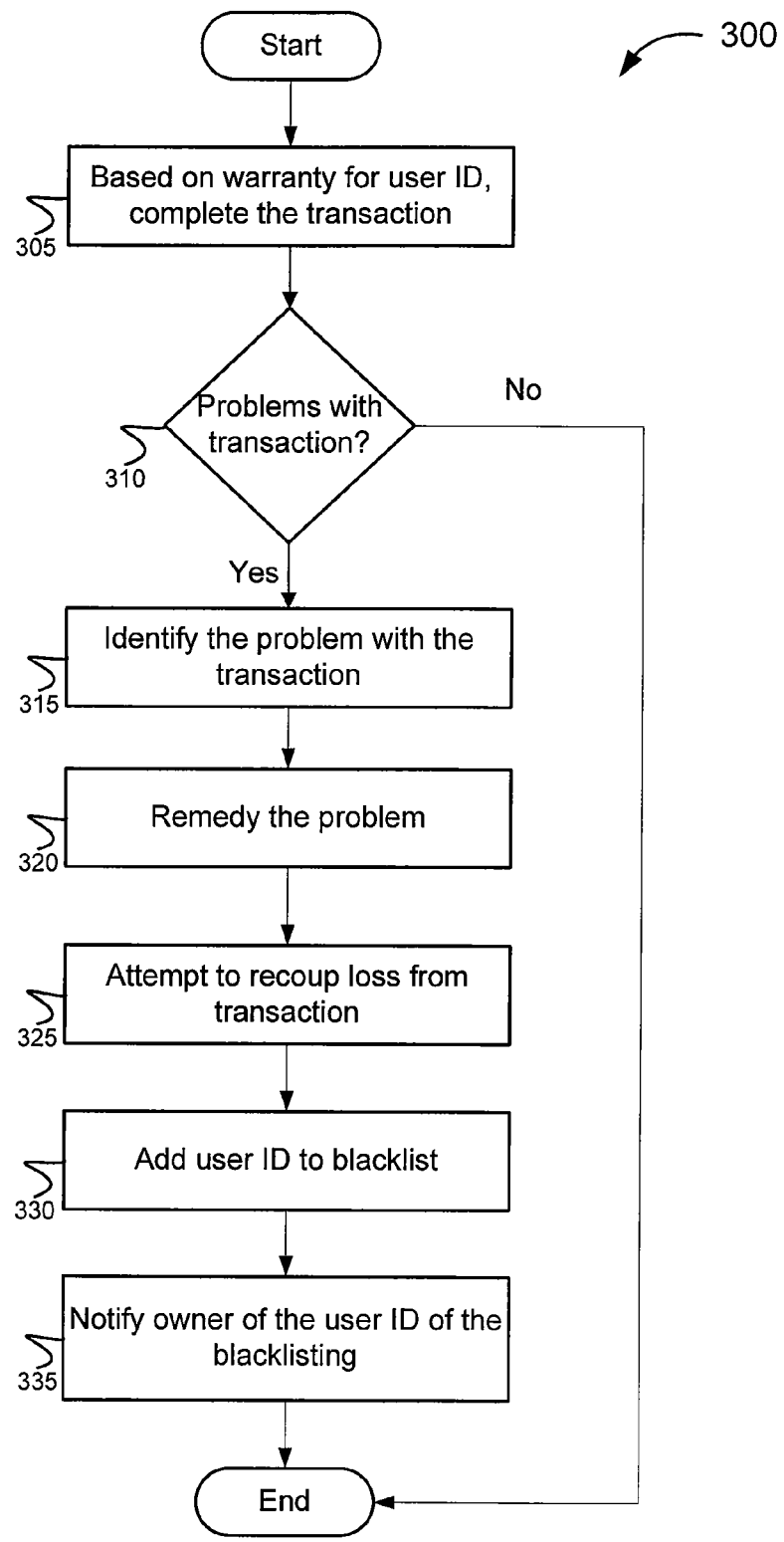
FIG. 3 is a flow diagram illustrating a further embodiment of certifying user ID accounts.

FIG. 3 illustrates a method 300 for processing a transaction with a certified user ID according to further aspects of the present invention. At process block 305, based on the user ID being warranted by the service provider, the transaction between the owner of the user ID and the customer may be completed. The transaction may be, for example, a purchase made by the customer from the owner, a sell made to the owner by the customer, etc.

At decision block 310, a determination may be made on whether there is a problem with the transaction. For example, the owner of the user ID may have purchased an item from the customer, but payment may have been denied (e.g., a chargeback, a false or bad PayPal™ account, a dishonored check or money order, insufficient funds, etc.). Alternatively, the customer may have purchased an item from the owner of the user ID and the item(s) may have been non-conforming (e.g., broken, incorrect, insufficient quantity, etc.). In such situations the problem with the transactions would need to be properly identified (process block 315).

At process block 320, an attempt to remedy the problem with the transaction may be undertaken. For example, the service provider may refund the customer's money for the broken or defective item; the customer may be paid by the service provider for the non-payment of an item sold by the customer, etc. In one embodiment, the service provider may put the customer in a position as if the problem with the transaction never occurred. Furthermore, if the owner of the user ID does not pay and/or present the requested goods after receiving payment, such an incident may be input into the user ID's history. Nonetheless, the user ID may still be allowed to continue to be approved in future transactions, with the non-payment/non-delivery acting as a factor against the user ID. In other words, failed transactions may not always translate into a complete moratorium for the user ID.

At process block 325, the service provider may attempt to recoup the loss from the transaction. In one embodiment, the service provider may attempt to communicate with the host ecommerce site provider in order to recoup the loss. In some situations, the host site provider may have policies in place for recouping all or part of the loss. In a further embodiment, the service provider may seek the loss directly from the owner of the user ID that caused the problem with the transaction.

At process block 330, the user ID may be added to the negative database. Accordingly, until the problem has been remedied the user ID would not be able to be certified by the service provider. Alternatively, the user ID's risk score may be deducted, and if too many failed transactions occur, the user ID may then be added to the negative database. Nonetheless, the failed transaction perpetrated by the owner of the user ID will negatively affect the ability of the user ID to be certified by the service provider.

At process block 335, the service provider may notify the owner of the user ID that their user ID has been added to the negative database. The notification may be in the form of an email, a text message, a real-time browser message, a regular post letter, a telephone call, etc. The notification may provide the owner with a URL, "1-800" number or the like, to contact in order to dispute and/or remedy the problem with the transaction(s). The owner may be able to pay the amount owed plus a transaction fee, or the owner may be given an opportunity to dispute being added to the negative database and provide information to support their claim.

Figure 4:
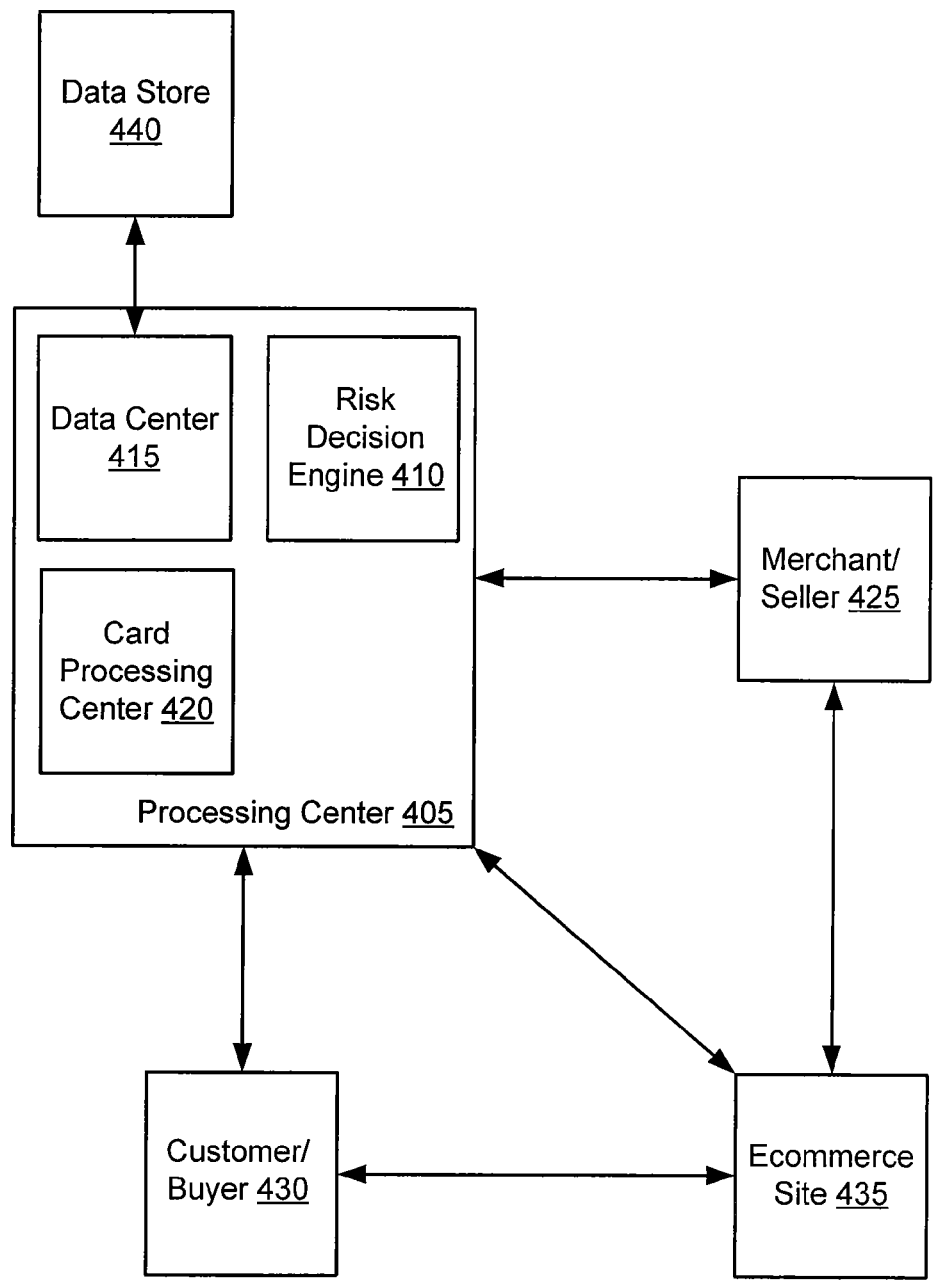
FIG. 4 is a block diagram illustrating one embodiment of a system for remedying problems with transactions completed with certified user IDs.

Referring now to FIG. 4, which illustrates a system 400 for certifying user ID accounts according to aspects of the present invention. In one embodiment, system 400 may include a processing center 405. Processing center 405 may be operated by, for example, the service provider described above. In one embodiment, processing center 405 may include a risk decision engine 410, a data center 415, and a card processing center 420.

In one embodiment, risk decision engine 410 may be configured to receive information about various user IDs and owners of the user IDs in order to generate risk scores associated with each of the user IDs. Risk decision engine 410 may be coupled with data center 415 and card processing center 420 to receive personal, financial, and biographical information about owners of the user IDs. For example, data center 415 (e.g., FastData™) may be coupled with a data store 440 which may include personal information about the owners of the user IDs. For example, data store 440 may be a database which includes previous addresses, current address, phone numbers, length of time at current residence, employment status, employment location, etc. Such information can be retrieved from data store 440 by data center 415 and presented to risk decision engine 410. Accordingly, risk decision engine 410 may utilize the received information to generate the risk scores associated with each of the user IDs. Alternatively, data store 440 may be a credit card reporting agency, or the like.

In a further embodiment, card processing center 420 may be coupled with risk decision engine 410. Card processing center 420 may be configured to gather financial information about the owners of the user IDs and present such information to risk decision engine 410. Such information may include bank account information, stored value card account information, credit card information, credit history, payment history, etc. Accordingly, risk decision engine 410 may use the received financial information in determining the risk scores for each user ID.

Furthermore, system 400 may include an ecommerce site 435. Ecommerce site 435 may be, for example, an online auction, classified site, etc., and may provide a merchant/seller 425 and/or customer/buyer 430 with the infrastructure to buy and sell goods and/or services. In addition, ecommerce site 435 may have information collected about the owners of each of the user IDs. For example, ecommerce site 435 may have transaction history, personal information, financial information, feedback information, etc. In one embodiment, ecommerce site 435 may provide processing center 405 with such information. Hence, processing center 405 may provide risk decision engine 410 with the received information in order for risk decision engine 410 to generate the risk scores for each user ID. Therefore, risk decision engine 410 can receive information about the owners of each of the user IDs from a variety of locations in order to provide a robust view of the owners of the user IDs.

In a further embodiment, merchant/seller 425 and/or customer/buyer 430 may transmit to processing center 405 a request to enroll in processing center 405's certification service. Once enrolled customer/buyer 430 and/or merchant/seller 425 may be granted access to "certified" buyers and sellers, and may also be able themselves to be certified. Further, whenever customer/buyer 430 or merchant/seller 425 attempts to enter into a transaction, receive or place a bid, etc., processing center 405 may provide the certification/warranty service described above in FIGS. 1, 2, and 3.

Figure 5:
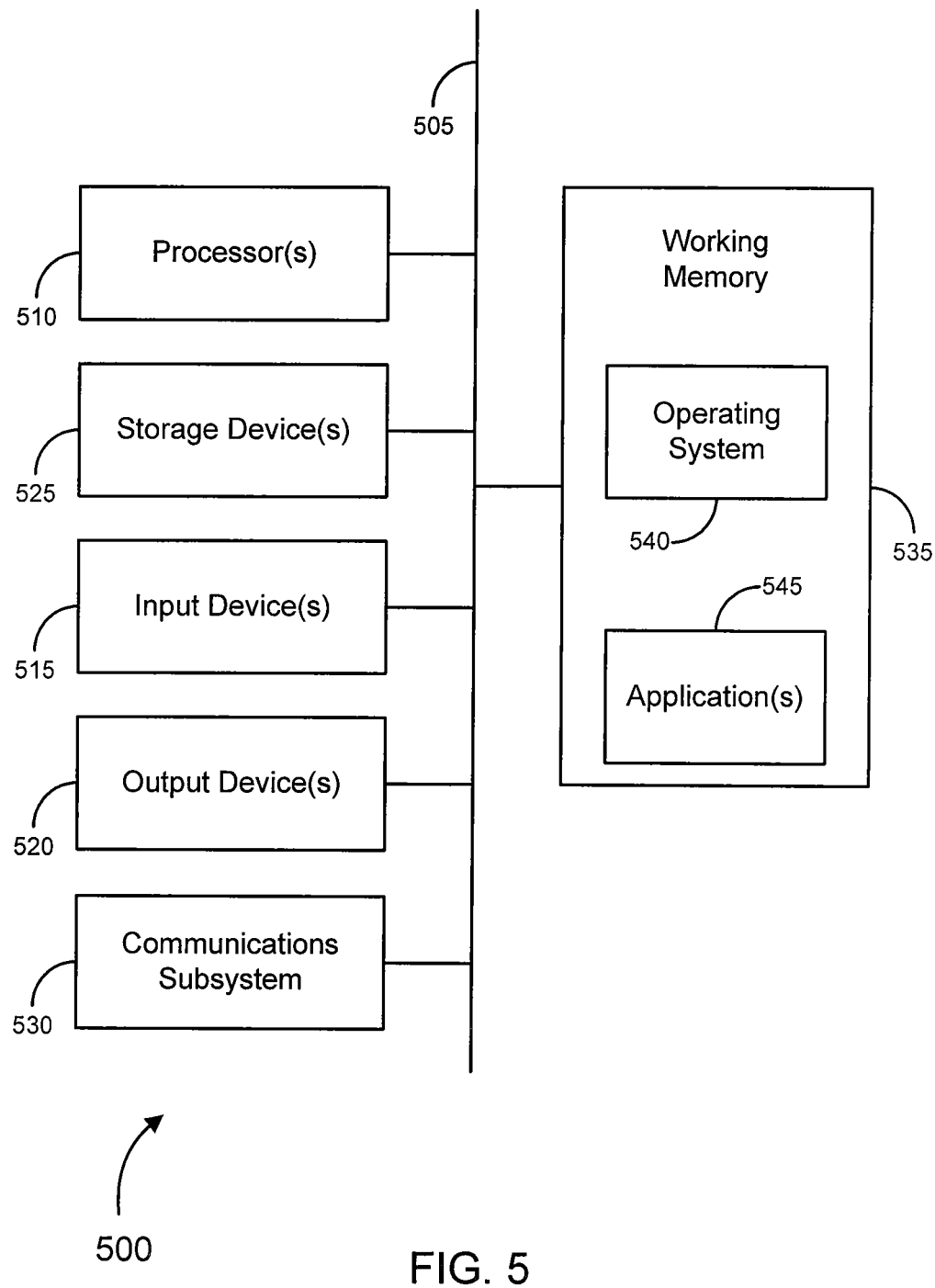
FIG. 5 is a generalized schematic diagram illustrating a computer system, in accordance with various embodiments of the invention.

Turning now to FIG. 5 which provides a schematic illustration of one embodiment of a computer system 500 that can perform the methods of the invention, as described herein, and/or can function, for example, as any part of processing center 405, data store 440 or risk decision engine 410. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, etc.); one or more input devices 515, which can include without limitation a mouse, a keyboard, etc.; and one or more output devices 520, which can include without limitation a display device, a printer, etc.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable, etc. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), etc. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 500, and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape or any other magnetic medium, a CD-ROM, any other optical medium, punchcards, papertape, any other physical medium with patterns of holes, a RAM, a PROM, an EPROM, a FLASH-EPROM or any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals, etc., are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device(s) 525 either before or after execution by the processor(s) 510.

Figure 6:
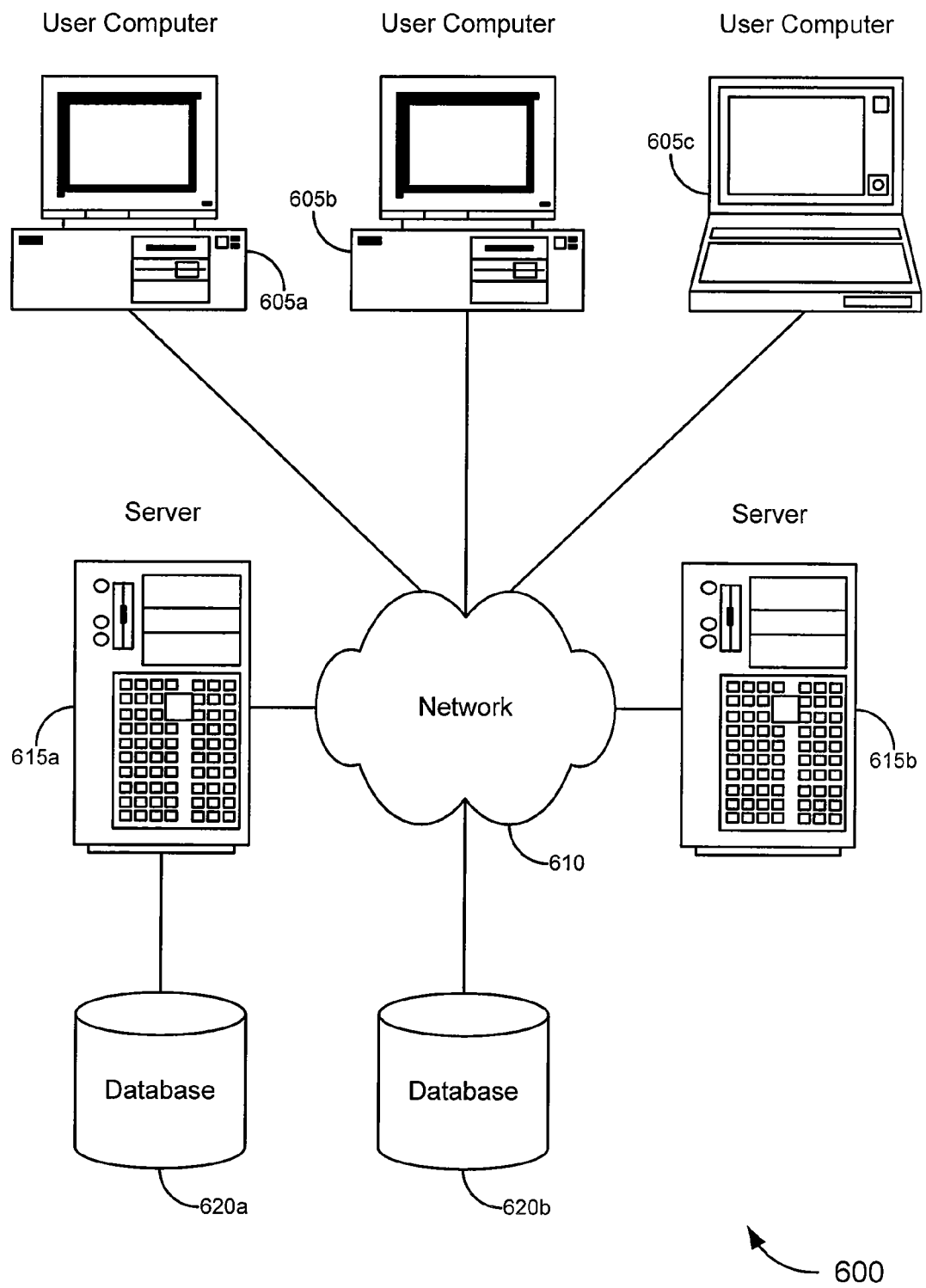
FIG. 6 is a block diagram illustrating a networked system of computers, which can be used in accordance with various embodiments of the invention.

A set of embodiments comprises systems for implementing staged configuration modeling. In one embodiment, user computers 605 and/or servers 615 may be implemented as computer system 500 in FIG. 5. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any of a variety of appropriate operating systems such as of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and the like; a wide-area network (WAN), a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols; the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially or freely available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the user computers 605 and/or other servers 615. Merely by way of example, the servers 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 605 and/or another server 615. In some embodiments, an application server can create web pages dynamically for displaying the information in accordance with embodiments of the invention, such as a customer signup web page. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the databases 620 is discretionary: merely by way of example, a database 620a might reside on a storage medium local to, and/or resident in, a server 615a and/or a user computer 605. Alternatively, a database 620b can be remote from any or all of the user computers 605 and servers 615, so long as the database can be in communication (e.g., via the network 610) with one or more of these. In a particular set of embodiments, a database 620 can reside in a storage-area network ("SAN") familiar to those skilled in the art. Likewise, any necessary files for performing the functions attributed to the user computers 605 and servers 615 can be stored locally on the respective computer and/or remotely, as appropriate. In one set of embodiments, the database 620 can be a relational database, such as an Oracle™ database, that is adapted to store, update and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of certifying a user identity (ID), the method comprising:
   receiving, at a computer system from a customer, a certification request for a user ID associated with one or more ecommerce websites;
   identifying, by the computer system, the user ID's owner;

collecting, by the computer system, information about the owner, wherein the information includes at least one of financial information, personal information, and biographical information;

analyzing, by the computer system, the collected information to generate a risk score associated with the user ID;

determining whether the risk score exceeds a threshold;

when it is determined that the risk score exceeds the threshold:
- certifying, by the computer system, the user ID, wherein the certification comprises providing an assurance of a successful transaction at the one or more ecommerce websites with the owner of the user ID; and
- providing the certification to the customer that requested the certification; and when it is determined that the risk score does not exceed the threshold:
- adding the user ID to a restricted list; and
- providing, to the customer:
  - an indication that a certification has not been issued in response to the certification request;
  - the risk score associated with the user ID; and
  - an option for proceeding with a transaction with the owner.

2. The method of claim 1, further comprising, when it is determined that the risk score does not exceed the threshold, transmitting a notification of the denial to the owner of the user ID.

3. The method of claim 2, wherein the notification is transmitted to the owner using at least one of text messaging, email, short message service (SMS), and instant messaging.

4. The method of claim 2, wherein the notification is a real-time browser message indicating one or more of the following: approval, denial, certification, and non-certification.

5. The method of claim 1, further comprising, when it is determined that the risk score does not exceed the threshold, restricting the customer from entering into a transaction with the owner of the user ID.

6. The method of claim 1, wherein the certification of the user ID comprises guaranteeing a successful transaction between the customer and the certified user ID.

7. The method of claim 6, further comprising, in response to a transaction with the certified user ID defaulting, refunding the customer's loss.

8. The method of claim 1, further comprising:
collecting information for additional user IDs;
analyzing the information for the additional user IDs;
generating risk scores for each of the additional user IDs; and
based on the additional user IDs exceeding the threshold, certifying the additional user IDs. additional user IDs.

9. The method of claim 8, further comprising:
generating a list of certified user IDs; and
publishing the list.

10. The method of claim 8, further comprising associating a certification logo with each of the certified user IDs.

11. The method of claim 8, further comprising storing the collected information for the additional user IDs in a database.

12. The method of claim 11, further comprising:
collecting additional information about the additional user IDs; and
updating the additional user IDs with the additional information.

13. The method of claim 1, wherein the one or more ecommerce website are at least one of an online auction site, a brick and mortar store'S website, a classified website, and a virtual store website.

14. The method of claim 1, wherein the biographical information includes at least one of the owner's drivers license number, home address, social security number, work address, home phone number, work phone number, marital status, and employment status.

15. The method of claim 1, wherein the financial information includes at least one of the owner's transaction history, bank account information, credit account information, credit score, credit report, past transaction faults, and feedback rating.

16. The method of claim 15, wherein the past transaction faults include one or more of denial payment, no payment, returned payment, and number of chargebacks per transaction.

17. The method of claim 1, wherein the customer signs up for a certification service.

18. The method of claim 1, further comprising charging a fee for certification of the user ID.

19. The method of claim 1, wherein the analysis further includes checking a transaction history associated with the user ID for suspicious activity.

20. The method of claim 1, wherein the customer comprises a seller.

21. the method of claim 1, wherein the customer comprises the buyer.

22. A non-transitory machine-readable medium of certifying a user identity (ID), having sets of instructions stored thereon which, when executed by a machine, cause the machine to:
receive, from a customer, a certification request for a user ID associated with one or more ecommerce services;
identify the user ID's owner;
collect information about the owner, wherein the information includes at least one of financial information, personal information, and biographical information;
analyze the collected information to generate a risk score associated with the user ID;
determine whether the risk score exceeds a threshold;
when it is determined that the risk score exceeds the threshold:
- certify, by the computer system, the user ID, wherein the certification comprises providing an assurance of a successful transaction at the one or more ecommerce websites with the owner of the user ID; and
- provide the certification to the customer that requested the certification; and when it is determined that the risk score does not exceed the threshold:
- add the user ID to a restricted list; and
- provide, to the customer:
  - an indication that a certification has not been issued in response to the certification request;
  - the risk score associated with the user ID; and
  - an option for proceeding with a transaction with the owner.

* * * * *